(12) United States Patent
Villalpando (10) Patent No.: US 6,219,718 B1
(45) Date of Patent: *Apr. 17, 2001

(54) APPARATUS FOR GENERATING AND TRANSFERRING MANAGED DEVICE DESCRIPTION FILE

(75) Inventor: Victor Villalpando, Laguna Hills, CA (US)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/497,111

(22) Filed: Jun. 30, 1995

(51) Int. Cl.[7] .................................................. G06F 9/00
(52) U.S. Cl. ............................................ 709/317; 709/230
(58) Field of Search ..................................... 395/700, 680, 395/500, 884, 200.32, 200.36, 200.37; 709/310–332, 200–252

(56) References Cited

U.S. PATENT DOCUMENTS

| | | | |
|---|---|---|---|
| 5,278,978 | * | 1/1994 | Demers et al. ........................ 707/101 |
| 5,303,243 | * | 4/1994 | Anezaki .................................. 714/13 |
| 5,367,635 | * | 11/1994 | Bauer et al. ........................... 709/221 |
| 5,404,532 | * | 4/1995 | Allen et al. ............................ 713/200 |
| 5,452,433 | * | 9/1995 | Nihart et al. .......................... 709/223 |
| 5,491,796 | * | 2/1996 | Wanderer et al. .................... 709/224 |
| 5,509,123 | * | 4/1996 | Dobbins et al. ....................... 709/243 |
| 5,522,042 | * | 5/1996 | Fee et al. ............................... 709/226 |
| 5,561,769 | * | 10/1996 | Kumar et al. ......................... 709/202 |
| 5,710,908 | * | 1/1998 | Man ....................................... 709/230 |
| 5,951,649 | * | 9/1999 | Dobbins et al. ....................... 709/238 |

OTHER PUBLICATIONS

R. W. Stevens, Unix Network Programming, Prentice Hall, pp. 692–693, 1990.*

Mark A. Miller, P. E., Troubleshooting TCP/IP—Analyzing the Protocol of the Internet, M&T Books, pp. 368–371, 373–374, 376–378, 388, 1992.*

M. Sylor and O. Tallman, "Applying Network Management Standards to System Management; The case for the Common Agent", IEEE, Systems Management, 1993 International Worksyhop, pp. 110–117, 1993.*

O. Newkerk, M. Nihart and S. K. Wong, "The Common Agent—A Multiprotocol Management Agent", IEEE, J. Selected Areas in Communications, pp. 1346–1352, 1993.*

Sakuraba et al. "Using a Networked Mach IPC implemented in user–space with x–kernel", OSF Research Institute, pp. 1–13, Apr. 1994.*

B. Moore, et al., "CMIP/SNMP Integration Prototype", Proceedings Of The Network Operations And Management Symposium, vol. 1, Symp. No. 4, Feb. 14, 1994, pp. 257–267.

S. Mazumdar, et al., "Design Of Protocol Independent Management Agent To Support SNMP And CMIP Queries", Integrated Network management, III, vol. c–12, Apr. 1993, pp. 377–388.

S. Reasoner, "Management By Proxy Agent", Wescon Technical Papers, vol. 35, Nov. 1, 1991, pp. 190–195.

* cited by examiner

Primary Examiner—St. John Courtenay, III
(74) Attorney, Agent, or Firm—Fitzpatrick, Cella, Harper & Scinto (57) ABSTRACT

In a computer network, processing modules exchange data with a peripheral device using managers at the processing module having different management protocols and one or more different management protocol agents in a network interface at the managed device. Data descriptive of the characteristics of the managed device is generated in the network interface in response to a request from a processing module manager. The generated descriptive data is sent to the requesting manager by the agent having the same management protocol as the requesting manager and a managed device description file is formed from the generated descriptive data by the processing module manager to control the managed device.

43 Claims, 9 Drawing Sheets

APPARATUS FOR GENERATING AND TRANSFERRING MANAGED DEVICE DESCRIPTION FILE

BACKGROUND OF THE INVENTION

1. Field of the Invention

The invention relates to networking processing modules and peripheral devices in a network connected computer system and more particularly to arrangements for providing information on the specifications of peripheral devices to processing modules using the peripheral devices in a network.

2. Description of the Related Art

In networked computer systems, processing modules and peripheral devices serving the processing modules are connected at different points of a network. The network couples the processing modules with other processing modules and the peripheral devices required to service the processing modules. Each processing module includes a manager that manages one or more peripheral devices servicing processing module applications by sending request messages to an agent at the managed device and receiving data returned from the managed device on status and attributes of the managed device. The messaging through the network may be performed using one of several available protocols. In exchanging data, the processing module application may use one of several different protocol models. If the OSI protocol model is employed, the CMIP management protocol is used for device management. Alternatively, the application may use the TCP/IP protocol model which includes the SNMP management protocol for device management.

U.S. Pat. No. 5,367,635 issued to Neal Bauer et al. on Nov. 22, 1994 discloses a computer network management system in which a user editable text file defining object identifications, object types and the path and name of associated executable software is generated and sent to a managed node. The user can then invoke user defined executable software by sending a network command and a user defined object identifier to the agent in a managed node. Data can then be sent between the user and the user defined executable software at the managed node. In order to manage a network peripheral device, however, the user processing module manager must store information on the characteristics of the device. The managed device characteristics information embedded in the processing module manager by the processing module supplier, however, may not correspond to the current characteristics of the managed device. As a result, the user executable software may not perform the desired functions in the managed device.

U.S. Pat. No. 5,404,532 issued to Wade C. Allen et al. on Apr. 4, 1994 discloses a networked computer system having communication between managers and agents in which an event forwarding discriminator in the agent program discriminates among events at the managed device to notify the manager only of significant events defined by the manager. The event forwarding discriminators are monitored so that if an event forwarding discriminator fails, the agent rebuilds or restores it with all its attributes and the manager is notified. The reconstruction of important portions of an agent, however, does not address the problem of providing a processing module manager with the characteristics of the agent of the managed device.

U.S. Pat. No. 5,278,978 issued to Richard A. Demers et al. on Jan. 11, 1994 discloses an arrangement for exchanging data between heterogeneous database systems by converting data in a receiving database system in which descriptive information exchanged between a sending database system and the receiving database system. In the event that the sending and receiving database systems are dissimilar, the data received in the format of the sending database system is converted to the format of the receiving database system. While the Demers et al. patent permits conversion of data between dissimilar machines, it does not relate to maintaining a managed device description file for the purpose of sending commands and controlling the device with respect to its status and attributes in a network.

Managed device characteristics are generally stored at the processing module manager in the form of a device description file specifying the characteristics of the managed peripheral device.

The description file, generally denoted as an MIB (Management Information Base), for each management protocol is written in a different format. In the SNMP management protocol, the MIB of the manager uses a syntax ASN.1. The CMIP management protocol uses a GDMO having the ASN.1 syntax but having a different format than the ASN.1 syntax for SNMP. In the event that the processing module manager operates under a different management protocol than the managed device, access to the data on the characteristics of the managed device may not be properly parsed by the processing module manager so that generation of a managed device description file at the manager would not be possible.

A description file for a peripheral device is generally supplied with the processing module manager for the application and is of the type corresponding the management protocol of the manager. A peripheral device in the network system, however, may utilize another management protocol so that the description file at the manager is not appropriate for the peripheral device. As a result, request messages from the manager based on the format of the management protocol thereat cannot be parsed by the agent in the managed peripheral device. Further, changes in the peripheral device may not be reflected in the description file supplied to the processing module manager from an outside source and a new peripheral device may be added for which there is no description file in the processing module manager.

If the management protocol of the processing module manager is different than the management protocol of a peripheral device managed by the processing module, data packets between the processing module manager and the agent of the managed device may not be sent with compatible management protocols and the description file at the processing module manager may not be in the required syntax. As a result, it is a problem in networked computer systems that description files of managed devices residing in processing module managers may not be useful in making queries on the status and the attributes of the managed device. Neither of the aforementioned patents address the problem of exchanging management data between processing module managers and managed device agents in a networked computer system having various management protocols.

SUMMARY OF THE INVENTION

The invention is directed to a networked computer system in which processing modules and peripheral devices serving the processing modules are coupled via a network. Each processing module has a manager operating under a predetermined management protocol that manages the serving peripheral devices. One or more of the peripheral devices has at least one agent for exchanging management information with the processing module managers over the network. A generating unit coupled to the at least one agent at the managed peripheral device generates data for determining a description file of the managed peripheral device in a format corresponding to the management protocol of the processing module manager using the peripheral device. The description file generated data is sent to the agent of the managed peripheral device. The agent receives the description file generated information and sends it to the processing module manager using the management protocol of the processing module manager.

In one embodiment of the invention, a network expansion board couples the managed peripheral device to the processing module manager through the network. An agent in the network expansion board that has the same management protocol as a manager requesting description file data receives the request and sends a command signal to a management information base (MIB) generator in the network expansion board. In response to the command signal from the agent, the MIB generator returns attribute and attribute value signals to the agent and the agent forms and sends one or more response messages to the manager through the network. At the processing module, the manager generates a description file which it then employs to exchange information with and to control the peripheral device.

In another embodiment of the invention, the network expansion board includes plural agents, each with a different management protocol. The agent having the same management protocol as the requesting manager receives the request and sends a command signal to the MIB generator. In response, the MIB generator generates and returns the description file signals of the peripheral device to the agent. The agent then forms data messages from the description file signals to the requesting processing module manager and sends the data messages to the requesting manager using the same management protocol as the requesting manager.

In yet another embodiment of the invention, the agent having the same management protocol as that of the requesting manager receives the request and generates command signals which address the peripheral device attributes and attribute values stored in the MIB generator. The description file data is retrieved from the MIB generator by the agent which forms data messages corresponding thereto. The agent then sends the description file data messages to the requesting manager through the network. Upon receiving the description file data, the requesting manager generates and stores a description file for use in exchanging information with and managing the peripheral device.

A more complete understanding of the invention is described with reference to the following detailed description of the preferred embodiment thereof in connection with the attached drawings.

DETAILED DESCRIPTION OF THE PREFERRED EMBODIMENT

Figure 1:
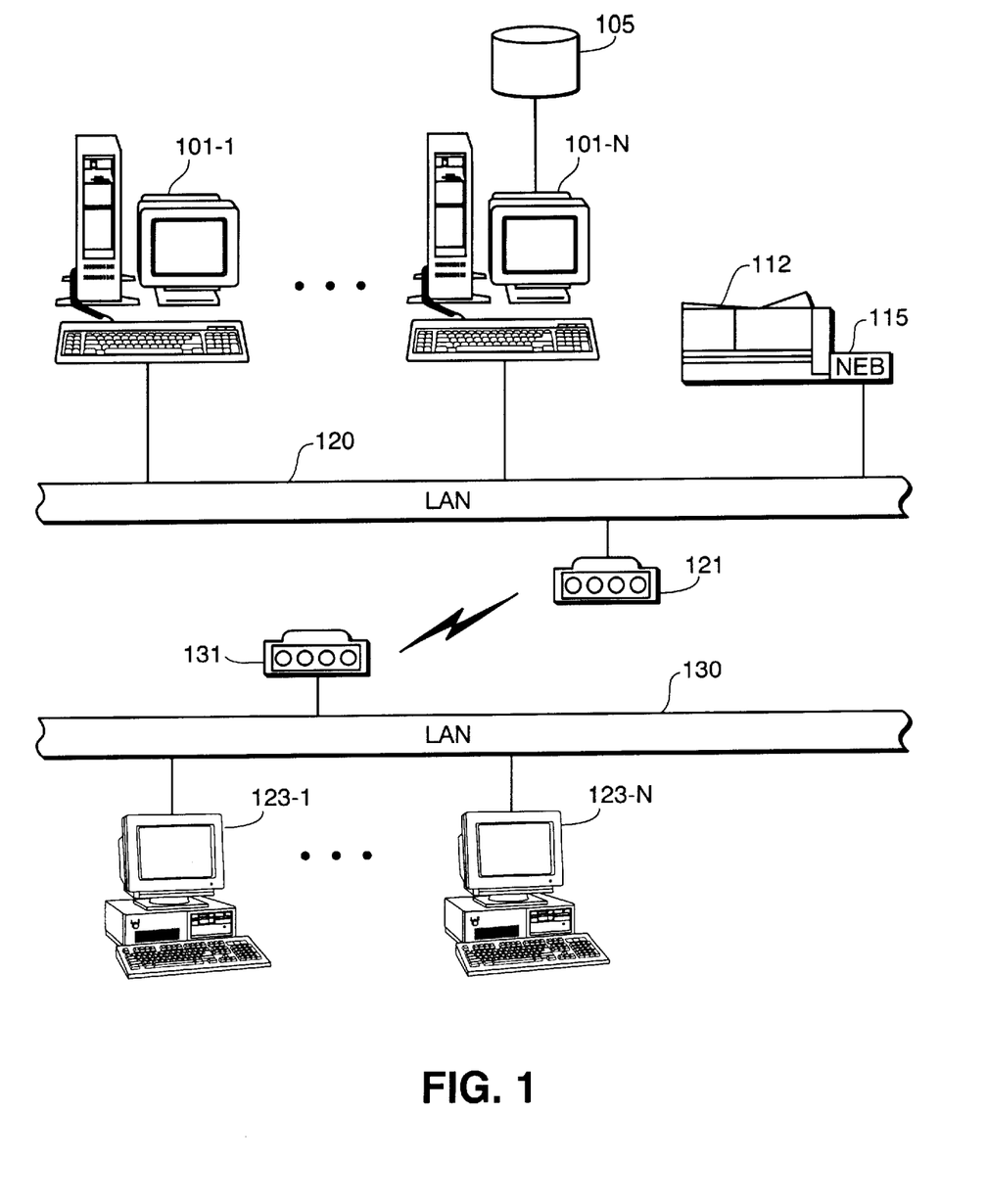
FIG. 1 depicts a computer network structure having an arrangement of processing modules and peripheral devices coupled to interconnected local area networks.

FIG. 1 shows a computer system in which plural processing modules and peripheral devices are coupled through interconnected local area networks (LAN). Referring to FIG. 1, there are shown LANs 120 and 130, work stations 101-1 through 101-N, terminals 123-1 through 123-N, a printer 112, a network expansion board 115 at the printer 112, a disk drive unit 105 and wireless coupling modules 121 and 131. Work stations 101-1 through 101-N are connected to the LAN 120 and terminals 123-1 through 123-N are connected to the LAN 130. The printer 112 is coupled to the LAN 120 through the network interface board 115 and the disk drive unit 105 is connected to the work station 101-N. The wireless coupling modules operate to interconnect the LANs 120 and 130.

As is well known in the art, the arrangement of FIG. 1 permits each processing module to utilize the resources of the other processing modules and peripheral devices connected to the network although the processing modules and the other network resource devices may be located in different offices, on different floors of the same building or in different buildings. For example, the terminal 123-1 can be coupled to the printer 112 and/or to the disk device connected to work station 101-N so that the special services provided by the printer 112 and the work station 101-N may be utilized by a user at terminal 123-1. Coupling of processing modules with other processing modules and peripheral devices is performed by exchanging data packets through the network using a standard protocol. The OSI and the TCP/IP protocol models in common use permit exchange of data among the different apparatus connected to the network.

Figure 2:
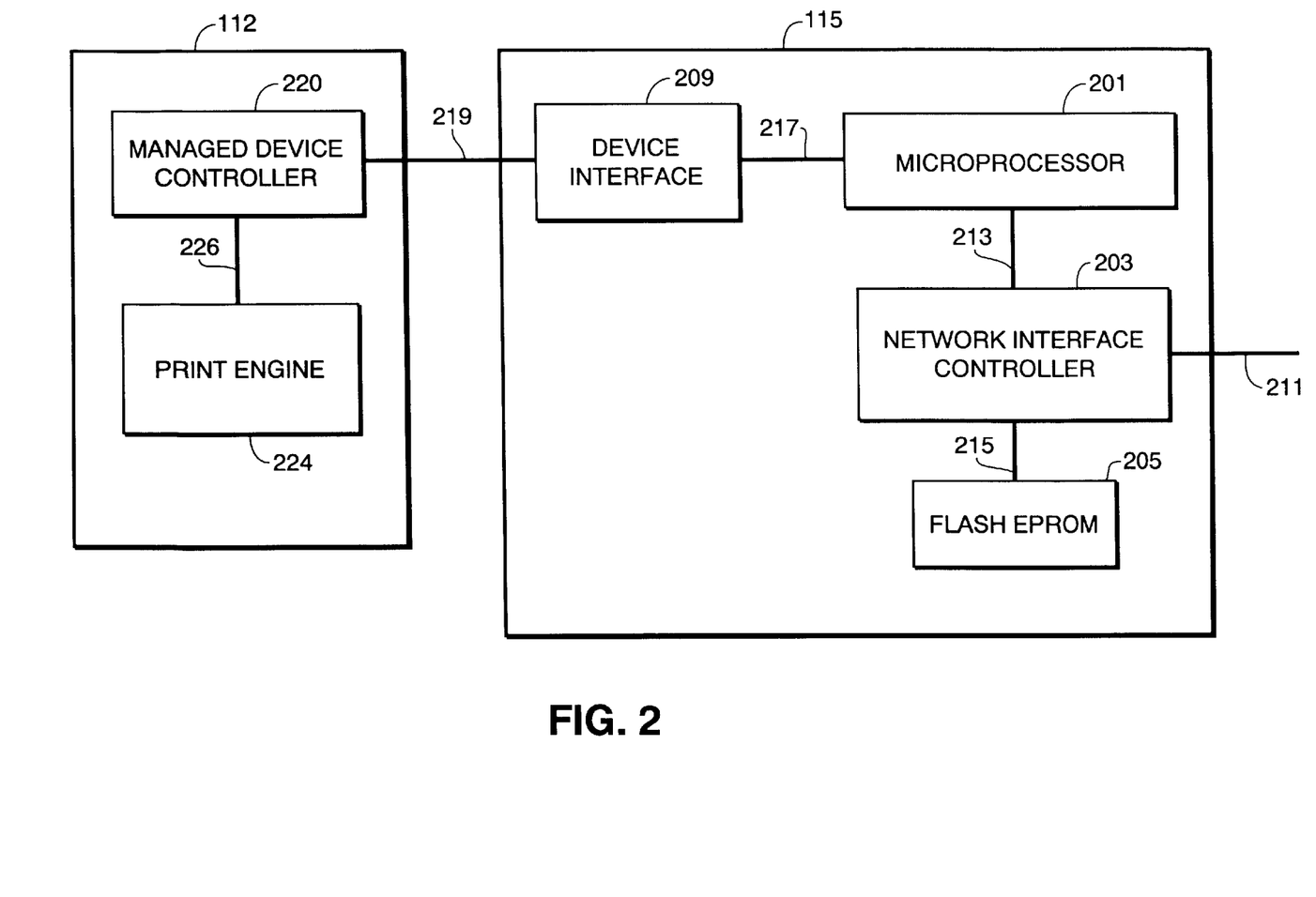
FIG. 2 is a general block diagram of a network interface board connected between a local area network and a network printer.

FIG. 2 is a general block diagram of the network expansion board (NEB) 115 connected between the LAN 120 and the printer 112. The NEB 115 provides hardware, software and firmware that permits a network peripheral, such as a printer, to be an intelligent, interactive network member that receives and processes data from the network, and also transmits to the network significant amounts of data about the peripheral such as detailed status information and operational parameters. The NEB 115 may also be used to connect other peripheral devices such as facsimile devices, copiers, image processors or peripheral devices in which facsimile, copying and image processing are combined into one unit to the network.

Referring to FIG. 2, the NEB 115 includes a microprocessor 201, a network interface controller 203, a flash or electrically programmable memory 205 used to control the microprocessor 201 through the network interface controller 203 and a managed device interface 209. The microprocessor 201 may preferably be an Intel 80C188EA-20 8-bit processor, the details of which can be found in the 80C186EA/80188EA User's Manual, Intel p/n 270950-001, Intel Corp. This processor is an 8-bit processor with direct memory access (DMA), interrupts, timers, and a DRAM refresh control. Other microprocessors, such as an AMD 80C188-20 8-bit microprocessor, might alternatively be used. The printer 112 includes a device controller 220 and a print engine 224. The network interface controller 203 is coupled to the LAN 120 through a cable 211, to microprocessor 201 through a line 213 and to the flash memory 205 through a line 215. The managed device interface 209 is coupled to the microprocessor 201 through a line 217 and is coupled to the device controller 220 through a line 219.

In the printer 112, the device controller 220 is coupled to the print engine 224 via a line 226. The managed device interface 209 allows extensive printer status and control information to be exported to NEB 115 and thence to an external network node so as to allow programming of many useful support functions. In the NEB 115, blocks of print image data and control information are assembled by the microprocessor 201, are written into a shared memory in the managed device interface 209, and are then read by printer controller 220. Likewise, printer status information is transferred from printer controller 220 to the shared memory of the managed device interface 209, from which it is read by the microprocessor 201.

In operation, the network interface controller 203 receives data and control information from a processing module (e.g. 101-1) which it may serve via the LAN 120 and the line 211 and sends status information on the printer 112 to the processing module using the printer through the LAN 120. The managed device interface 209 transfers print data and control information data received from the microprocessor 201 to the device controller 220 of the printer 112 and transfers status signals from the device controller 220 to the microprocessor 201. The status signals may include information on transient state; on-line, printing; off-line, not printing; engine test detected; maintenance program running; in sleep mode; paper out; printer open; paper jam; no EP cartridge; toner low; U-L feed; load paper; feed paper; CaPSL operator call; upper feeder reject; middle feeder reject; lower feeder reject; set upper; set middle; paper drain; tray full; page full; 22 LINE ERROR; 40 LINE ERROR; download memory full; working memory full; deadlock memory full; job reject; print check; font full; engine warming up; external operator call; front card removal; NVRAM full; hard disk full; memory full; low resolution, can't switch to low; hard disk crash; "please power off"; full paint reject; scale error; duplex reject; expansion I/O error; tray trouble; resident ROM: bad format; not supported option; no option font; unavoidable memory full; service call is active; starting state; going off-line; going on-line; off-line, not printing, in a menu; transient, menu finished, return to OFFLINE; panel reset requested; SWOFF detected (power down request); reboot system; panel form feed requested; panel form feed cancelled; external program test print; test print cancelled; maintenance program done.

The managed device interface 209 includes a shared buffer memory to store data being transferred and a control logic unit that directs the flow of information between the microprocessor 201 and the device controller 220 or other arrangements well known in the art. The arrangement of the network interface controller 203, the microprocessor 201 and the controlled device interface 209 provides bidirectional information exchange between the printer 112 and the processing module using the printer. Examples of bidirectional network interfaces are described in U.S. Pat. No. 5,323,393, which describes a network device having a bi-directional SCSI interface and U.S. patent application Ser. No. 08/336,062, entitled "Network Protocol Sensor", which describes a network device having a bi-directional shared memory interface.

Figure 3:
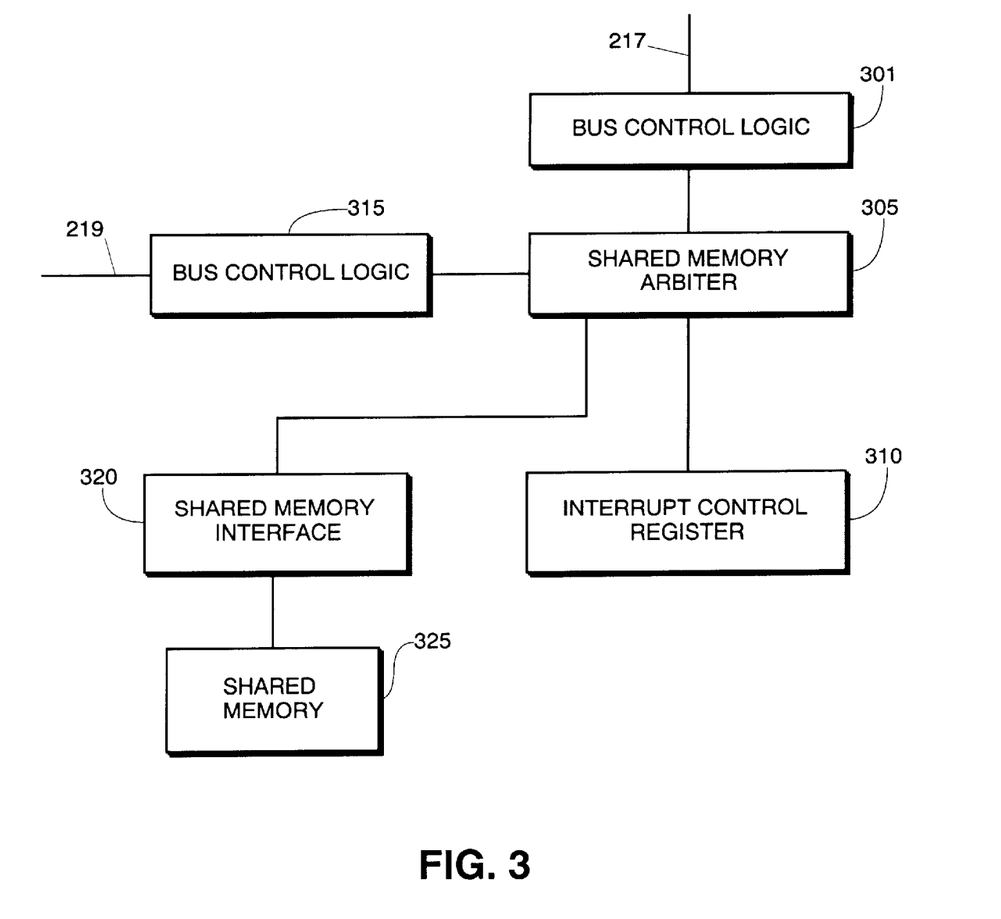
FIG. 3 is a more detailed block diagram of the managed device interface of FIG. 2.

FIG. 3 is a more detailed block diagram of the controlled device interface 209. The controlled device interface 209 includes a shared memory 325, a shared memory interface 320, a shared memory arbiter 305, an interrupt control register 310 and bus control logic units 301 and 315. Referring to FIG. 3, the bus control logic 301 communicates with the microprocessor 201 through the line 217 and the managed device controller 220 communicates with bus control logic 315 through the line 219. Shared memory accesses from the bus of the managed device controller 220 and the bus of the microprocessor 201 are routed to the shared memory arbiter 305 which determines the priority of the buses and permits the bus having priority to access the shared memory 325. The interrupt control register 310 also accessed through the shared memory arbiter 305 allows interruption of one of the microprocessor 201 and the managed device controller 220 by the other.

In operation, the controlled device interface 209 interleaves concurrent accesses of the microprocessor 201 and the controller 220 by allowing access to the shared memory 325 on a first-come, first-serve basis. The lower priority unit of the microprocessor 201 and the controller 220 is presented with a wait state while the higher priority unit has access to the shared memory 325. In the event of simultaneous access requests, the microprocessor 201 is given priority. A large portion of the shared memory 325 has a ring buffer structure into which the microprocessor 201 writes print data and from which the printer controller 220 reads the print data. As the writing and reading of data blocks proceeds, the microprocessor 201 and the controller 220 update their respective "put" and "get" pointers to indicate the next location that should be accessed. By comparing the "put" and "get" pointer, the writing unit of microprocessor 201 and controller 220 can then determine the availability of memory space and the reading unit can determine whether there is data to be read. Contention for the shared memory 325 is reduced by allowing the printer controller 220 sole access to the shared memory 325 until its reading catches up with the writing of the microprocessor 201.

As is well known, the operations of a peripheral device such as printer 112 in servicing processing modules such as work stations 101-1 and 101-N through the LAN 120 are managed from the processing modules. In running an application, a manager in the processing module exchanges messages in the form of packet data units with an agent residing in the flash memory 205 of the NEB to manage the operations of the printer 112 in the application. The packet data units (PDU) sent by the processing module manager employ a predefined management protocol in sending PDUs to the agents residing in the NEB 115 and in receiving PDUs from the NEB 115.

Figure 4:
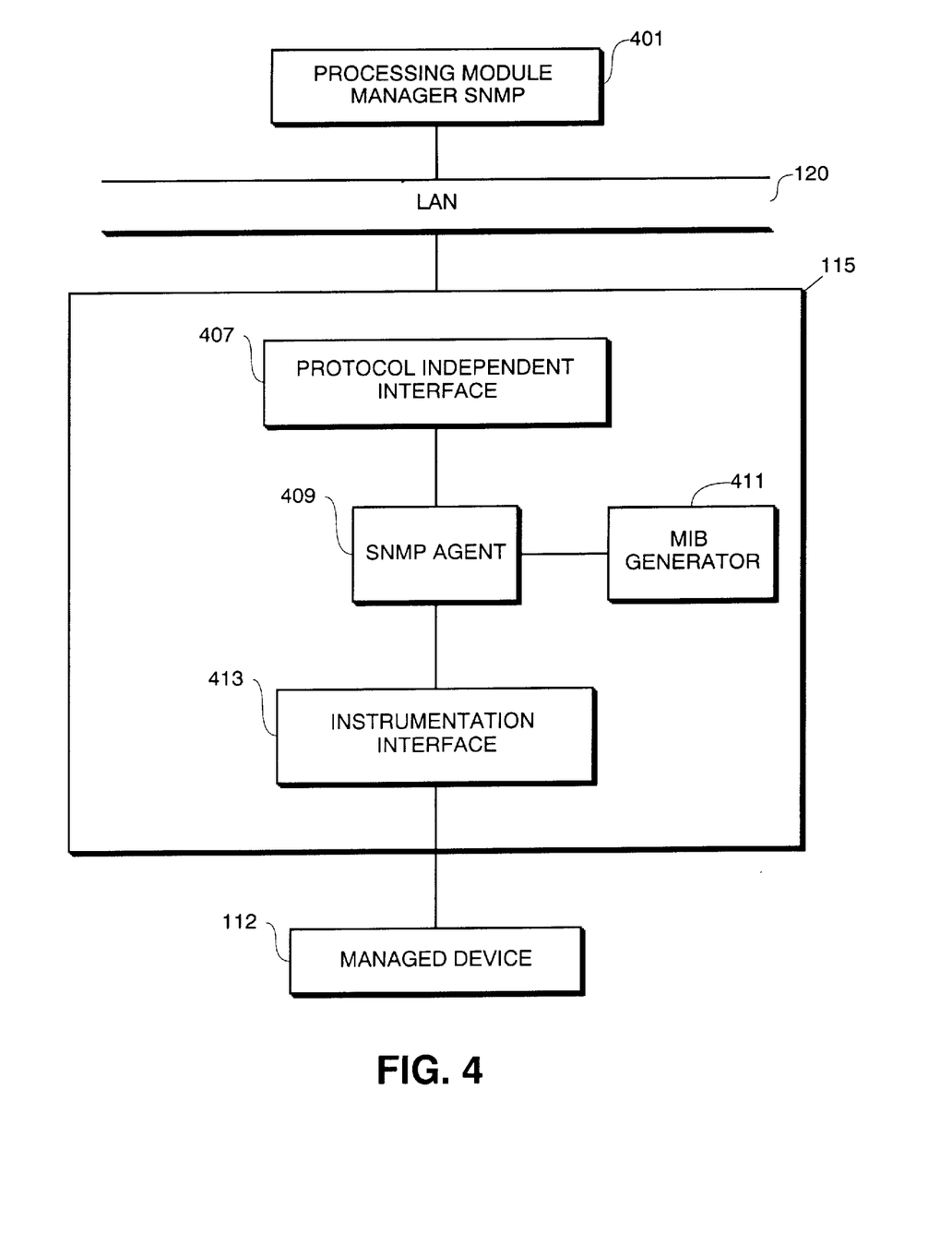
FIG. 4 is a diagram illustrating the arrangement of an agent between instrumentation and network interfaces in the network interface board of FIG. 2 according to a first embodiment of the invention.
Figure 5:
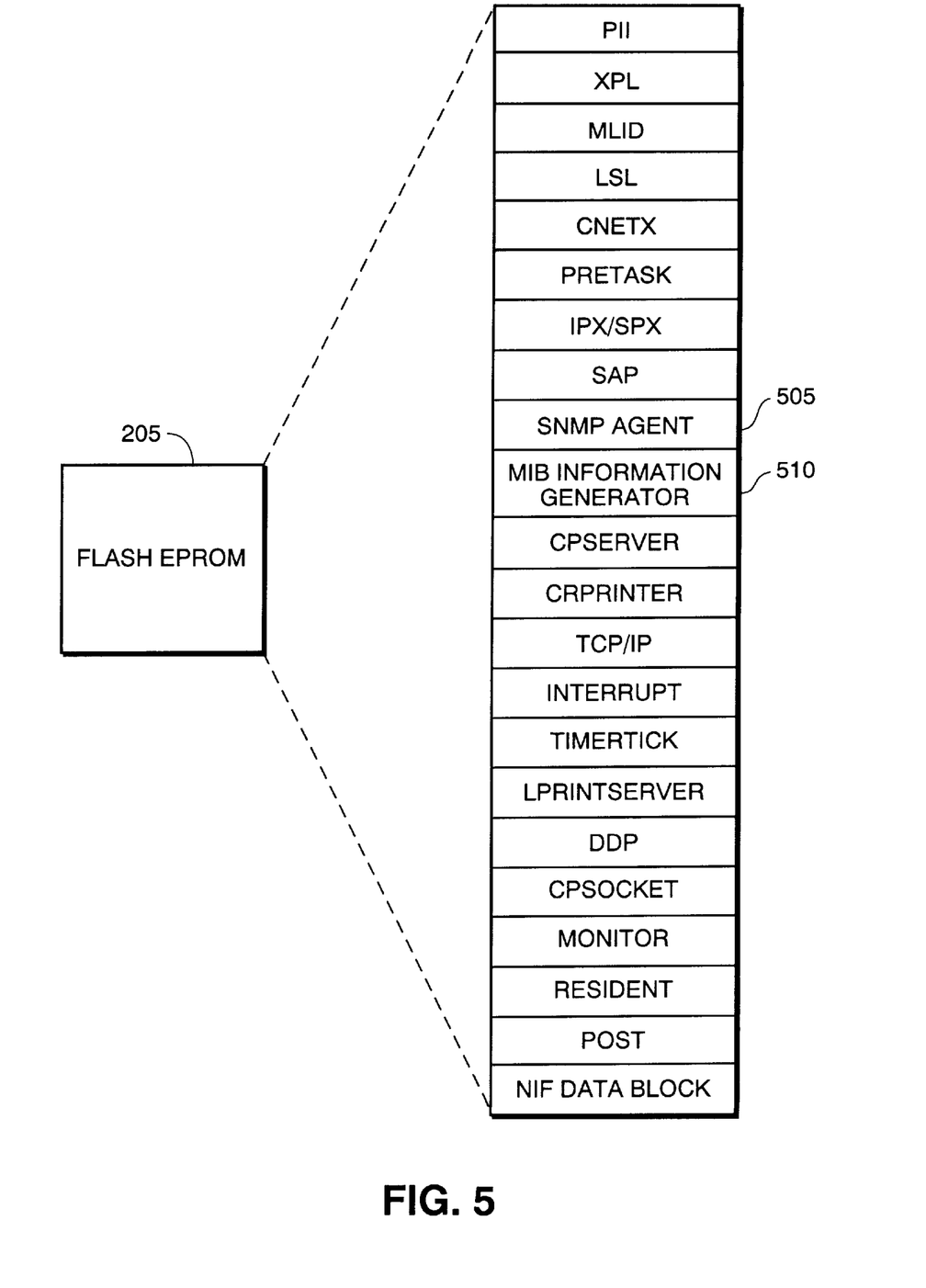
FIG. 5 shows an arrangement of the agent and a management information base software module in the control memory of the network interface board of FIG. 2 according to the first embodiment.

FIG. 4 illustrates diagrammatically the arrangement of an agent between instrumentation and network interfaces in the network interface board of FIG. 2 according to the first embodiment of the invention. In FIG. 4, there are shown an SNMP processing module manager 401, the LAN 120, a protocol interface 407, an SNMP agent 409, a management information base (MIB) information generator 411, an instrumentation interface 413 and a managed device 112. The SNMP agent 409, the MIB information generator 411 and the instrumentation interface 413 are instruction code modules stored in the flash memory 205 of FIG. 2. FIG. 5 illustrates the placement of the SNMP agent module 505 and the MIB information generator module 510 in the flash memory 205. Also shown in FIG. 5 are the following instruction code modules, which are described in more detail in Ser. No. 08/495,172, "Adaptive Network Protocol Independent Interface" (attorney docket No. 36.P102): PII, XPL, MLID, LSL, CNETX, PRETASK, IPX/SPX, SAP, CP.SERVER, CRPRINTER, TCP/IP, INTERRUPT, TIMERTICK, LPRINTSERVER, DDP, CPSOCKET, MONITOR, RESIDENT, POST and NIF DATA BLOCK. The SNMP agent module 505, when activated, provides instruction codes that direct the operation of the microprocessor 201 to perform the SNMP agent functions and the MIB information generator module 510, when activated, controls the operation of the microprocessor 201 through its stored instruction codes.

The SNMP agent module may contain instruction codes which the microprocessor uses 201 to activate the MIB information module 510. When activated, the MIB information module 510 generates signals corresponding to a description of the peripheral device 112 from information stored in the memory 205. Alternatively, the stored information signals in the MIB information module are addressed by the agent which retrieves the values of the addressed signals.

In accordance with the invention, a processing module manager issues an MIB information request which is sent to the agent of the managed peripheral device having the same management protocol as that of the requesting manager. In response, the agent directs the MIB information generator to return the data on the characteristics of the managed device needed to construct an MIB file at the processing module manager, generates PDUs corresponding to the data returned by the MIB information generator and sends the PDUs to the processing module manager. Rather than relying on a management information base independently supplied with the processing module as in the prior art, the processing module manager in the present invention is provided with an up-to-date description file obtained from the agent of the managed device for use in querying the agent on its status and attributes.

Figure 6:
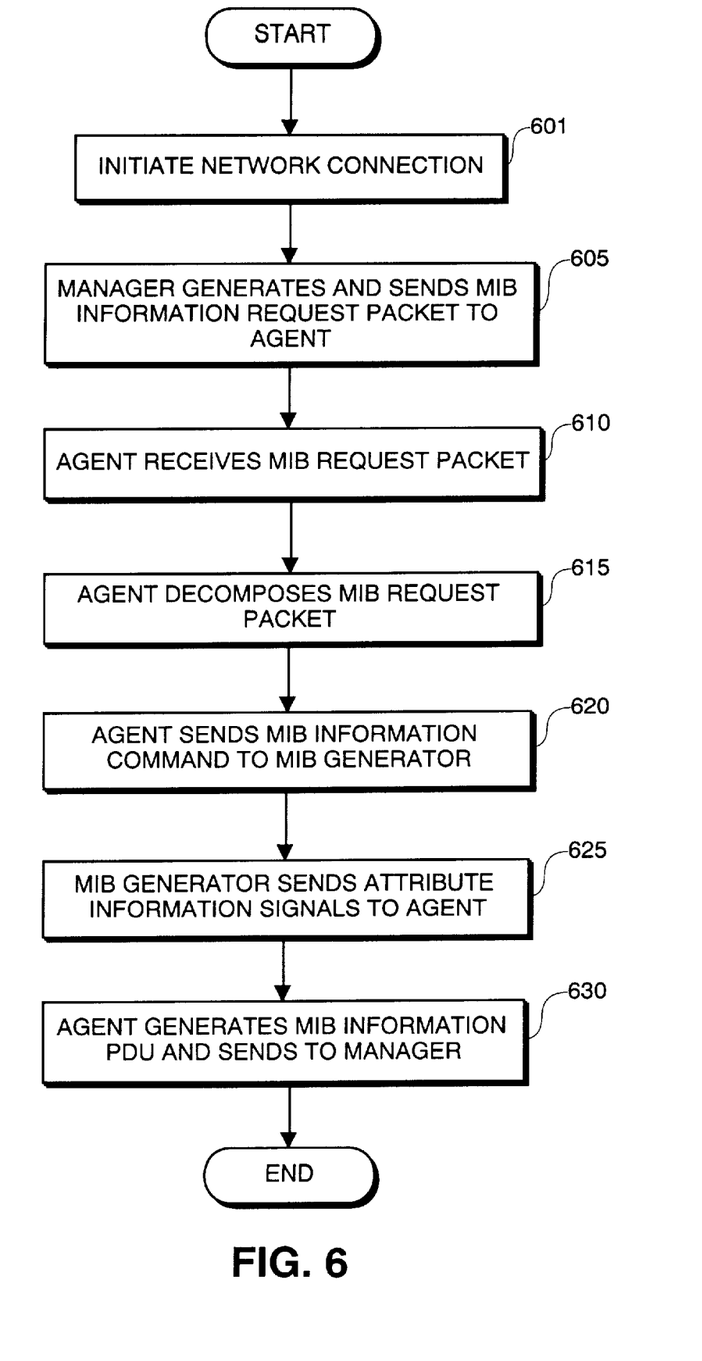
FIG. 6 is a flow chart illustrating the method of providing a processing module manager with data descriptive of the characteristics of a managed peripheral device according the first embodiment of the invention.

FIG. 6 is a flow chart that shows the operations of the microprocessor 201 of the NEB 115 which are determined by the instruction codes of the SNMP agent module 505 and the MIB information generator module 510. It is assumed for purposes of illustration that the networked coupled processing module manager 401 operates under the same management protocol as the agent 409. An arrangement with another management protocol may be used as long as the manager and the agent operate under the same management protocol. In step 601, a network connection with the managed device SNMP agent 409 is initiated by the SNMP manager 401. The manager 401 then generates an MIB information request packet and sends the packet to the agent 409 (step 605). When the agent 409 receives the MIB request packet (step 610), it decomposes the packet (step 615), generates an MIB information command signal and sends the MIB information command signal to the MIB generator (step 620). The MIB information generator 411 produces and returns the data needed to construct an MIB to the agent 409 (step 625) and the agent 409 generates the MIB information PDUs responsive to the returned data and sends the PDUs to the processing module manager 401.

In actual operation, the SNMP agent module 505 in the flash memory 205 is activated and the microprocessor 201 operates under control of the agent module 505 to perform the operations of steps 610, 615 and 620. The MIB information generator module 510 is then activated to control the microprocessor 201 to perform the operations of step 625 and the agent module 505 is reactivated after the data from the MIB information generator is made available to cause the microprocessor 201 to receive the data generated by the MIB information generator, to form the PDUs corresponding thereto and to send the PDUs to the processing module manager.

Figure 7:
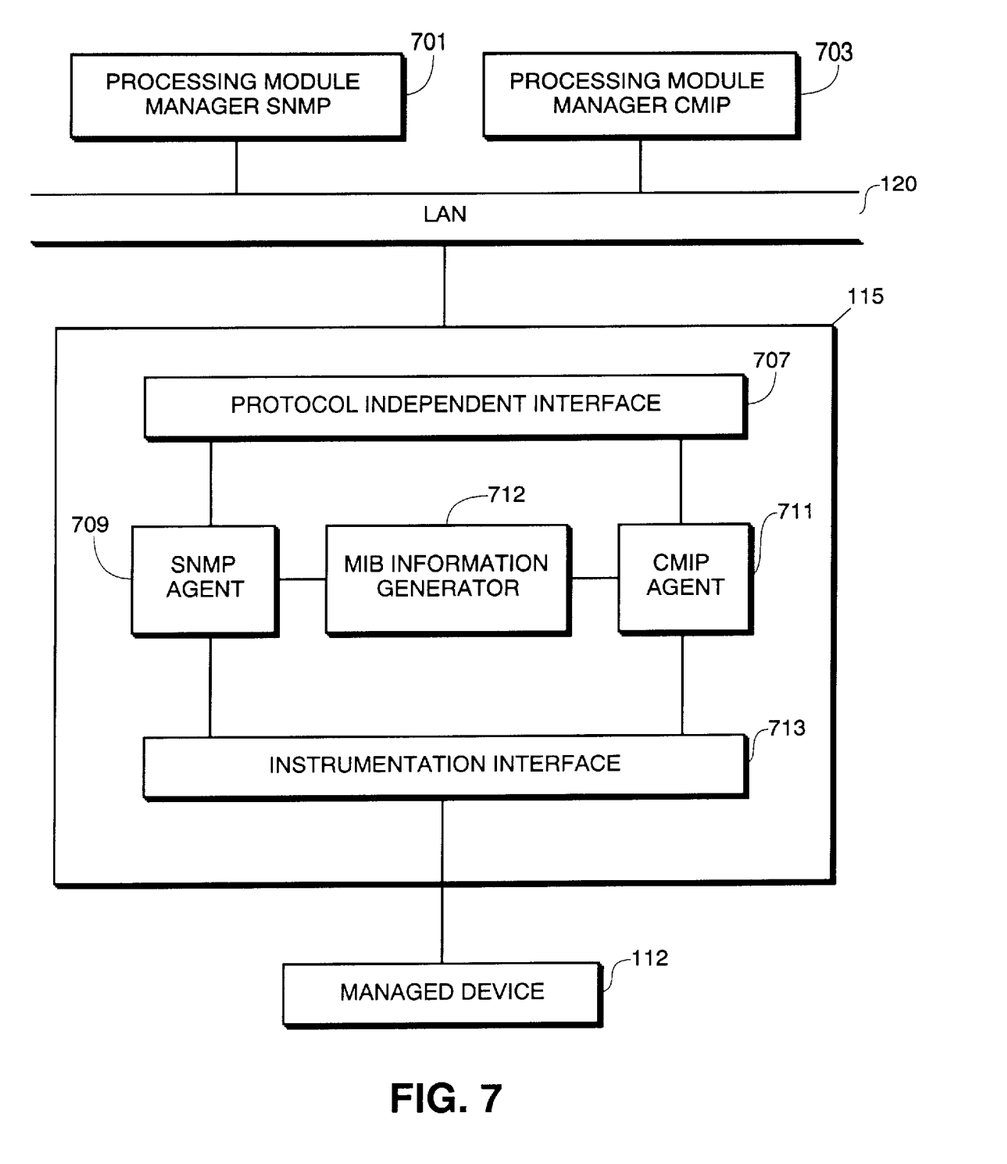
FIG. 7 is a diagram illustrating the arrangement of an agent between instrumentation and network interfaces in the network interface board of FIG. 2 according to a second embodiment of the invention.

FIG. 7 diagrammatically illustrates the operation of the NEB 115 according to a second embodiment of the invention. In this embodiment, there is an SNMP agent and a CMIP agent for the managed device so that an SNMP processing module manager and a CMIP processing module manager operating under different management protocols are each provided with MIB information to form an MIB description file according to its management protocol. In FIG. 7, there are shown an SNMP processing module manager 701, a CMIP processing module manager 703, a protocol interface 707, an SNMP agent 709, a CMIP agent 711, an MIB information generator 712, an instrumentation interface 713 and a managed device 112. The processing module managers 701 and 703 and the protocol interface 707 are coupled to the LAN 120. The SNMP agent 709 and the CMIP agent 711 are coupled between the protocol interface 707 and the instrumentation interface 713. The MIB information generator 712 is connected to both the SNMP agent 709 and the CMIP agent 711.

In accordance with the invention, plural agents each operating under a different management protocol are coupled to the processing module managers through the network. An MIB information request from a processing module manager is accepted by the agent operating under the same management protocol as the requesting manager and the data provided by the MIB information generator is formatted according to the management protocol of the requesting manager. The data is returned to the requesting manager which operates to form an MIB file at the processing module. In this way, a properly formatted up-to-date MIB file using the resident management protocol of the processing module manager is produced for use in querying the agent of the managed device with regard to status and attributes.

Figure 8:
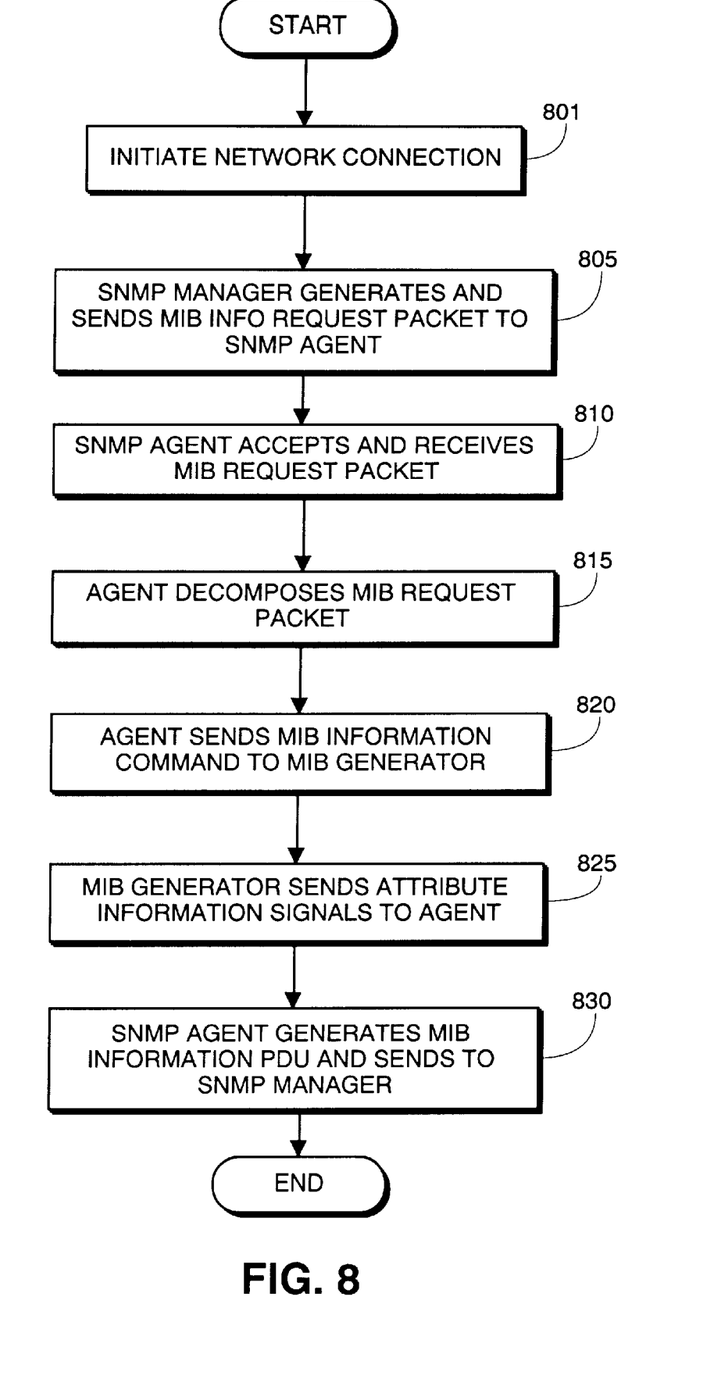
FIG. 8 is a flow chart illustrating the method of providing a processing module manager with data descriptive of the characteristics of a managed peripheral device according the second embodiment of the invention.

FIG. 8 is a flow chart that illustrates the operations of the NEB 115 according to the second embodiment of the invention. Referring to FIG. 8, a network connection is initiated by the requesting processing module manager (step 801). It is assumed for purposes of illustration that the SNMP manager 701 makes an MIB information request (step 805). In that case, the SNMP agent 709 accepts the request and receives the MIB information request. If the CMIP manager makes the request, it would be accepted by the CMIP agent 711. In response to the accepted MIB information request, the SNMP manager 709 decomposes the MIB information request packet (step 815), produces an MIB information command signal and sends the MIB information command signal to the MIB generator 712 (step 820). The MIB information generator 712 generates and returns the data needed to construct an MIB file to the agent 709 (step 825). The agent 709 receives the data from the MIB information generator, forms the MIB PDUs corresponding to the data and sends the data to the SNMP manager 701 via the protocol interface 707 and the LAN 120 (step 830).

Figure 9:
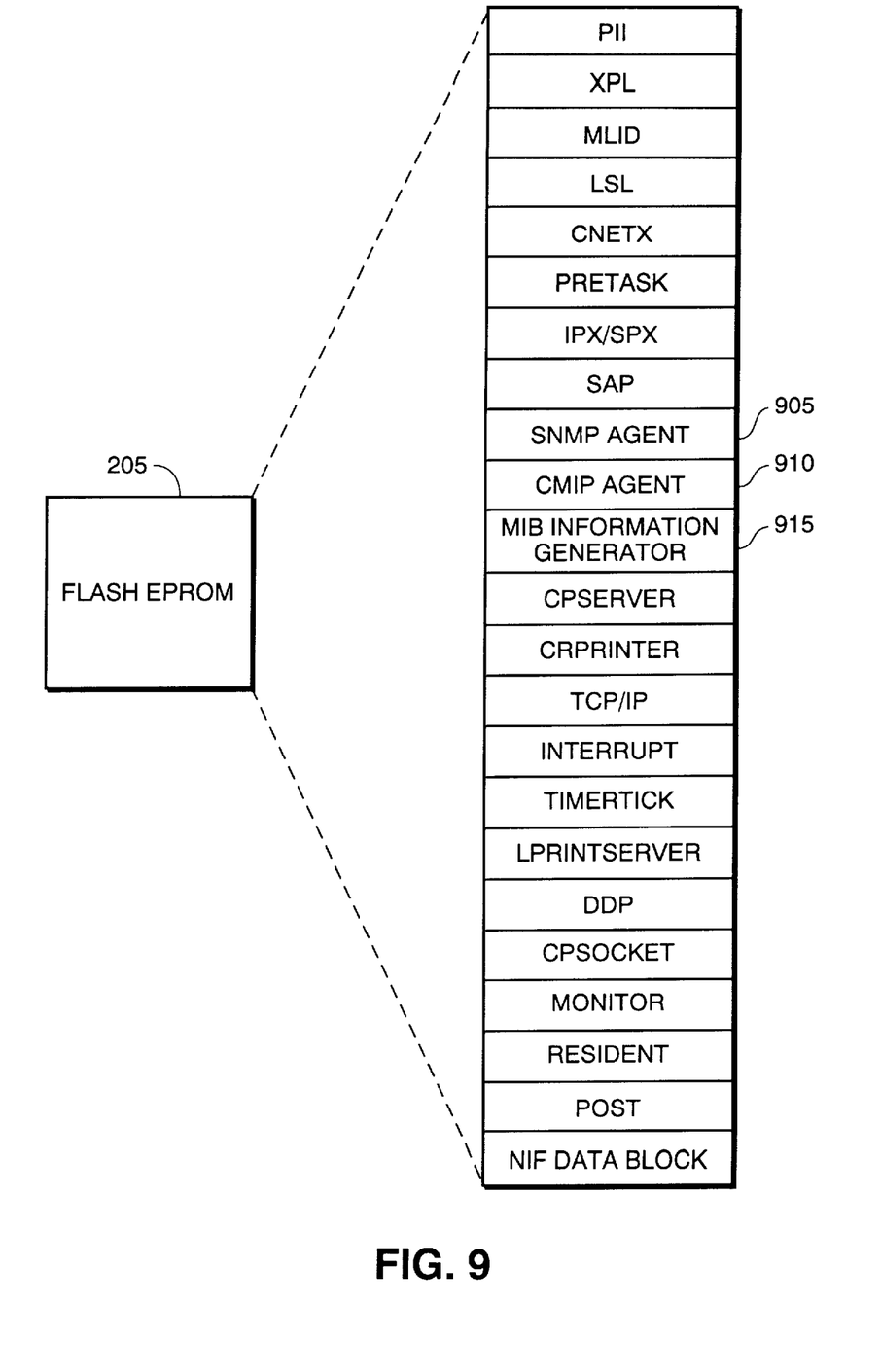
FIG. 9 shows an arrangement of agent and management information base software modules in the control memory of the network interface board of FIG. 2 according to the second embodiment.

As aforementioned with respect to FIG. 5, the agents and the MIB information generators are instruction code modules in the flash memory 205 which control the operations of the microprocessor 201 of the NEB 115 shown in FIG. 2. FIG. 9 shows the placement of the agent instruction code modules 905 and 910 and the MIB information generator module 915 in the flash memory 205. When the agent module is activated responsive to the MIB information request of the SNMP processing module manager 701, the microprocessor 201 performs the operations of steps 810, 815 and 820. The MIB information generator module 915 is then activated so that the managed device characteristics data is transferred to the SNMP agent module (step 825). The SNMP agent module is then activated so that the microprocessor 201 forms the PDUs corresponding to the MIB information data and sends the MIB data PDUs to the SNMP manager (step 830). As discussed with respect to FIG. 5, the agent either sends command signals to the MIB information generator module 915 which forms and sends return signals to the agent 905 or the agent addresses the attribute signals stored in the MIB information generator 915 and retrieves attribute value signals therefrom.

While preferred embodiments of the invention have been described, it is to be understood that the invention is not limited to the above described embodiments and that various changes and modifications may be made by those of ordinary skill in the art without departing from the spirit and scope of the invention.

What is claimed is:

1. In a networked computer system wherein a manager of a processing module exchanges data with a peripheral device managed by the manager through an interface between a network and the managed device, and wherein the interface includes a protocol independent interface coupled to the network and plural agents for providing the manager with data packet units via one of plural network communication protocols available to the peripheral device, the data packet units descriptive of the managed device, the interface comprising:

receiving means, in the protocol independent interface, for receiving a network communication message having one of the plural network communication protocols, and for forwarding a request message contained therein from a processing module manager to one of the plural agents, the request message requesting data descriptive of the managed device and having a management protocol common to both the agent and the manager;

decomposing means, in the agent, for decomposing the request message into a command;

generating means, which is coupled to the agent and responsive to the command, for generating data corresponding to characteristics of the managed device based on attribute information for the managed device which is stored in the interface;

transferring means responsive to the generated data for transferring the data to the agent;

second generating means, at the agent, for generating data packet units corresponding to the data from the generating means, the data packet units having the common management protocol; and sending means, in the protocol independent interface, for sending the data packet units received from the agent to the manager using one of the plural network communication protocols, wherein the network communication protocol in which the request is received and the data packet units are sent is transparent to the agent.

2. The apparatus of claim 1, further comprising storing means for storing the attribute information.

3. The apparatus of claim 1, wherein the manager comprises means responsive to the data packet units received from the sending means for generating a management information base corresponding to the characteristics of the managed device.

4. An apparatus according to claim 1, wherein each of the plural agents operates under a different management protocol.

5. An interface according to claim 1, wherein the generating means is further coupled to each of the plural agents.

6. In a networked computer system including a plurality of processing modules and at least one peripheral device, each processing module having at least one manager to manage a peripheral device, the peripheral device including network interface means for interfacing the network and the peripheral device, the network interface means including a protocol independent interface coupled to the network and plural agents for communicating with a manager of a processing module via one of plural network communication protocols available to the peripheral device, the data packet units, a method for supplying the manager with characteristics of the peripheral device, the method comprising the steps of:

sending a request message for management information data in a network communication message using one of the plural network communication protocols, the request message is from the manager to one of the plural agents in the network interface means and having a management protocol common to both the agent and the manager;

receiving means, in the protocol independent interface, for receiving the network communication message, and for forwarding the request message contained therein to the agent;

decomposing, in the agent, the request message into a command;

generating a set of data corresponding to the characteristics of the managed device in the network interface means in response to the command, the generating step generating the set of data based on attributes for the managed device which are stored in the network interface means;

converting, in the agent, the set of data to a response message having the common management protocol and representing the set of managed device characteristic data; and sending the response message by the protocol independent interface to the manager via the network using one of the plural network communication protocols, wherein the network communication protocol in which the request is received and the response is sent is transparent to the agent.

7. The method of claim 6, further comprising the step of forming and storing a file descriptive of the managed device at the manager in response to the response message from the agent.

8. The method of claim 6, further comprising the step of storing the attributes of the managed device in the network interface means.

9. A method according to claim 6, wherein each of the plural agents operates under a different management protocol.

10. A method according to claim 6, wherein the set of data is accessible by each of the plural agents.

11. In a computer system including plural processing modules and peripheral devices coupled via a network, each processing module having at least one manager for managing one or more peripheral devices using a predetermined one of plural management protocols, and each peripheral device having plural agents associated therewith for exchanging management information with the processing module managers over the network, an apparatus, including a protocol independent interface coupled to the network and plural network communication protocols available to the apparatus, for interfacing one of the peripheral devices with one of the processing modules in order to manage the operations of the peripheral device, comprising:

storing means for storing attribute information of a managed peripheral device;

receiving means, in the protocol independent interface, for receiving a network communication message having one or plural network communications protocols, and forwarding a request message contained therein from a requesting processing module manager to one of the plural agents of the managed peripheral device, the request message having a management protocol common to both the agent and the manager;

decomposing means for decomposing, in the agent, the request message into a command;

generating means coupled to the agent for generating data descriptive of the managed peripheral device based on the stored attribute information in response to the command;

sending means for sending the data generated by the generating means to the agent of the managed peripheral device;

producing means, in the agent, responsive to receipt of the data from the sending means, for producing a set of data packets corresponding to the data generated by the generating means, the data packets having the common management protocol; and     sending means for sending the set of data packets by the protocol independent interface to the requesting processing module manager via the network using one of the plural network communication protocols,     wherein the network communication protocol in which the request is received and the data packets are sent is transparent to the agent.

12. The apparatus of claim 11, wherein the requesting processing module manager comprises forming means for forming a description file of the managed peripheral device in response to the set of data packets sent from the sending means.

13. An apparatus according to claim 11, wherein each of the plural agents operates under a different management protocol.

14. An apparatus according to claim 11, wherein the generating means is further coupled to each of the plural agents.

15. In a computer system including plural processing modules and peripheral devices coupled via a network, each processing module having (1) at least one manager for managing one or more of the peripheral devices using a predetermined one of plural management protocols, and (2) at least one peripheral device having plural agents associated therewith, each agent operating under a different one of the predetermined management protocols for exchanging management information with processing module managers over the network via a protocol independent interface and one of plural network communication protocols available to the peripheral device, an apparatus for interfacing a processing module with a managed peripheral device, comprising:

receiving means, in the protocol independent interface, for receiving a network communication message having one of the plural network communication protocols, and for forwarding a request message contained therein from a requesting manager of the processing module to one of the plural agents, the request having a management protocol common to both the agent and the manager;

decomposing means, at the agent, for decomposing the request message into a command;

generating means, coupled to the agent, for generating data corresponding to characteristics of the managed peripheral device in response to the command from the decomposing means, the generating means generating the data based on attributes for the managed peripheral device which are stored in the apparatus;

converting means for converting, in the agent, the generated data into a response message having the common management protocol; and     sending means, in the protocol independent interface, for sending the data converted by the converting means to the requesting manager using one of the plural network communication protocols,     wherein the network communication protocol in which the request message is received and the response message is sent is transparent to the agent.

16. The apparatus of claim 15, wherein the generating means comprises storing means for storing the attributes of the managed peripheral device and forming means for forming the set of data corresponding to managed device characteristics based on the stored attributes of the managed peripheral device.

17. The apparatus of claim 15, wherein the generating means comprises storing means for storing the attributes of the managed peripheral device, and wherein the agent includes means for addressing and retrieving the attribute signals.

18. The apparatus of claim 15, further comprising forming means for forming a description file of the managed peripheral device in the processing module manager based on the data sent by the sending means.

19. An apparatus according to claim 15, wherein the generating means is further coupled to each of the plural agents.

20. In a networked computer system wherein a manager of a processing module exchanges data with a peripheral device managed by the manager through an interface between a network and the managed device, and wherein the interface includes a protocol independent interface coupled to the network and plural agents, computer executable process steps to provide the manager with data packet units via one of plural network communication protocols available to the peripheral device, the data racket units descriptive of the managed device, said computer-executable process steps comprising:

code to receive, in the protocol independent interface, a network communication message having one of the plural network communication protocols, and for forwarding a request message contained therein from a processing module manager to one of the plural agents, the request message requesting data descriptive of the managed device and having a management protocol common to both the agent and the manager;

code to decompose, in the agent, the request message into a command;

code to generate, in the interface and responsive to the command, data corresponding to characteristics of the managed device based on attribute information for the managed device which is stored in the interface;

code to transfer the data to the agent;

code to generate data packet units, at the agent, corresponding to the generated data, the data packet units having the common management protocol; and code to send, in the protocol independent interface, the data packet units received from the agent to the manager using one of the plural network communication protocols, wherein the network communication protocol in which the request is received and the data packet units are sent is transparent to the agent.

21. Computer-executable process steps according to claim 20, further comprising code to store the attribute information of the managed device in the interface.

22. Computer-executable process steps according to claim 20, wherein the agent and the manager operate under a common management protocol.

23. Computer-executable process steps according to claim 20, wherein the manager includes code to generate a management information base corresponding to the characteristics of the managed device in response to received data packet units.

24. Computer-executable process steps according to claim 20, wherein each of the plural agents operates under a different management protocol.

25. Computer-executable process steps according to claim 20, wherein the generated data is accessible by each of the plural agents.

26. In a networked computer system wherein a manager of a processing module exchanges data with a peripheral device managed by the manager through an interface between a network and the managed device, and wherein the interface includes a protocol independent interface coupled to the network and plural agents, a computer-readable medium which stores computer-executable process steps, the computer-executable process steps to provide the manager with data packet units via one of plural network communication protocols available to the peripheral device, the data packet units descriptive of the managed device, the computer-executable process steps comprising:

a receiving step to receive, in the protocol independent interface, a network communication message having one of the plural network communication protocols, and for forwarding a request message contained therein requesting data descriptive of the managed device to one of the plural agents, the agent and the manager;

a decomposing step to decompose, in the agent, the request message into a command;

a first generating step to generate, in the interface and responsive to the command, data corresponding to characteristics of the managed device based on attribute information for the managed device which is stored in the interface;

a transferring step to transfer the data to the agent;

a second generating step to generate, at the agent, data packet units corresponding to the data from the first generating step, the data packet units having the common management protocol; and a sending step, in the protocol independent interface, to send the data packet units received from the agent to the manager using one of the plural network communication protocols, wherein the network communication protocol in which the request is received and the data packet units are sent is transparent to the agent.

27. A computer-readable medium according to claim 26, wherein the computer-executable process steps further comprise a storing step to store the attribute information of the managed device in the interface.

28. A computer-readable medium according to claim 26, wherein the agent and the manager operate under a common management protocol.

29. A computer-readable medium according to claim 26, wherein the manager generates a management information base corresponding to the characteristics of the managed device in response to received data packet units.

30. A computer-readable medium according to claim 26, wherein each of the plural agents operates under a different management protocol.

31. A computer-readable medium according to claim 26, wherein the data from the first generating step is accessible by each of the plural agents.

32. In a networked computer system including a plurality of processing modules and at least one peripheral device, each processing module having at least one manager to manage the peripheral device, the peripheral device including network interface means for interfacing the network and the peripheral device, the network interface means including a protocol independent interface coupled to the network and plural agents for communicating with a manager of a processing module via one of plural network communication protocols available to the peripheral device, the data packet units, computer executable process steps to supply the manager with characteristics of the peripheral device, said computer-executable process steps comprising:

code to send a request message for management information data in a network communication message using one of the plural network communication protocols, the request message is from the manager to one of the plural agents in the network interface means and having a management protocol common to both the agent and the manager;

receiving means, in the protocol independent interface, for receiving the network communication message, and for forwarding the request message contained therein to the agent;

code to decompose, in the agent, the request message into a command;

code to generate a set of data corresponding to the characteristics of the managed device in the network interface means in response to the command, the code to generate generating the set of data based on attributes of the managed device stored in the network interface means;

code to convert, in the agent; the set of data to a response message having the common management protocol and representing the set of managed device characteristic data; and code to send the response message by the protocol independent interface to the manager via the network using one of the plural network communication protocols, wherein the network communication protocol in which the request is received and the response is sent is transparent to the agent.

33. Computer-executable process steps according to claim 32, further comprising code to form and store a file descriptive of the managed device at the manager in response to the response message from the agent.

34. Computer-executable process steps according to claim 32, further comprising:
- code to store the attributes of the managed device in the network interface means; and
- code to form the set of data corresponding to the managed device characteristic data based on the stored attributes.

35. Computer-executable process steps according to claim 32, wherein the agent and the manager have a common management protocol.

36. Computer-executable process steps according to claim 32, wherein each of the plural agents operates under a different management protocol.

37. Computer-executable process steps according to claim 32, wherein the set of data is available to each of the plural agents.

38. In a networked computer system including a plurality of processing modules and at least one peripheral device, each processing module having at least one manager to manage the peripheral device, the peripheral device including network interface means for interfacing the network and the peripheral device, the network interface means including a protocol independent interface coupled to the network and plural agents for communicating with a manager of a processing module via one of plural network communication protocols available to the peripheral device, the data packet units, a computer-readable medium which stores computer-executable process steps, the computer-executable process steps to supply the manager with characteristics of the peripheral device, the computer-executable process steps comprising:
- a sending step to send a request message for management information data in a network communication message using one of the plural network communication protocols, the request message is from the manager to one of the plural agents in the network interface means and having a management protocol common to both the agent and the manager;
- receiving means, in the protocol independent interface, for receiving the network communication message, and for forwarding the request message contained therein to the agent;
- a decomposing step to decompose, in the agent, the request message into a command;
- a generating step to generate a set of data corresponding to the characteristics of the managed device in the network interface means in response to the command, the generating step generating the set of data based on attributes of the managed device stored in the network interface means;
- a converting step to convert, in the agent, the set of data to a response message having the common management protocol and representing the set of managed device characteristic data; and
- a sending step to send the response message by the protocol independent interface to the manager via the network using one of the plural network communication protocols,
- wherein the network communication protocol in which the request is received and the response is sent is transparent to the agent.

39. A computer-readable medium according to claim 38, further comprising a step to form and store a file descriptive of the managed device at the manager in response to the response message from the agent.

40. A computer-readable medium according to claim 38, further comprising:
- a storing step to store the attributes of the managed device in the network interface means; and
- a forming step to form the set of data corresponding to the managed device characteristic data based on the stored attributes.

41. A computer-readable medium according to claim 38, wherein the agent and the manager have a common management protocol.

42. A computer-readable medium according to claim 38, wherein each of the plural agents operates under a different management protocol.

43. A computer-readable medium according to claim 38, wherein the set of data is available to each of the plural agents.

* * * * *

UNITED STATES PATENT AND TRADEMARK OFFICE
CERTIFICATE OF CORRECTION

PATENT NO. : 6,219,718 B1
APPLICATION NO. : 08/497111
DATED : April 17, 2001
INVENTOR(S) : Victor Villalpando It is certified that error appears in the above-identified patent and that said Letters Patent is hereby corrected as shown below:

COVER PAGE

References Cited (56), OTHER PUBLICATIONS, line 9, "Worksyhop" should read --Workshop--.

COLUMN 2

Line 1, "information" should read --information is--.
Line 30, "corresponding" should read --corresponding to--.

COLUMN 4

Line 6, "according" should read --according to--.
Line 15, "according" should read --according to--.

COLUMN 7

Line 23, "uses 201" should read --201 uses--.

COLUMN 10

Line 1, "apparatus" should read --interface--.
Line 3, "apparatus" should read --interface--.
Line 8, "apparatus" should read --interface--.

COLUMN 12

Line 54, "racket" should read --packet--.

UNITED STATES PATENT AND TRADEMARK OFFICE
CERTIFICATE OF CORRECTION

PATENT NO. : 6,219,718 B1
APPLICATION NO. : 08/497111
DATED : April 17, 2001
INVENTOR(S) : Victor Villalpando

It is certified that error appears in the above-identified patent and that said Letters Patent is hereby corrected as shown below:

COLUMN 14

Line 53, "agent;" should read --agent,--.

Signed and Sealed this

Twenty-fourth Day of July, 2007

JON W. DUDAS
*Director of the United States Patent and Trademark Office*